United States Patent [19]
Overholser

[11] Patent Number: 5,346,074
[45] Date of Patent: Sep. 13, 1994

[54] PORTABLE DISPENSING UNIT FOR COMPACT DISKS

[76] Inventor: Jason W. Overholser, 4840 Lincolnshire St., Buena Park, Calif. 90621

[21] Appl. No.: 16,974
[22] Filed: Feb. 12, 1993
[51] Int. Cl.5 ............................................. A47F 5/00
[52] U.S. Cl. ..................................... 211/40; 206/309; 312/9.9
[58] Field of Search .................... 211/40, 41; 206/309; 312/9.9, 9.47, 9.48, 9.51, 9.64

[56] References Cited
U.S. PATENT DOCUMENTS

| 4,180,299 | 12/1979 | Tolerson | 312/9.64 X |
| 4,781,292 | 11/1988 | Sacherman et al. | 211/40 X |
| 4,790,434 | 12/1988 | Schoberg et al. | 211/40 X |
| 4,842,032 | 6/1989 | Mastronardo | |
| 4,892,189 | 1/1990 | Kunimune | |
| 4,932,522 | 6/1990 | Milovich | 211/40 X |
| 5,031,779 | 7/1991 | Szenay | |
| 5,097,946 | 3/1992 | Emrich | 206/309 X |
| 5,180,058 | 1/1993 | Hu | 211/40 X |
| 5,232,089 | 8/1993 | Kim | 211/40 X |

Primary Examiner—Robert W. Gibson, Jr.
Attorney, Agent, or Firm—Rhodes & Ascolillo

[57] ABSTRACT

An apparatus for dispensing and transporting compact discs within a compact disc container has a housing and at least one pair of opposing guide rails in the housing. A guide and retention member is placed within opposing guide rails to guide and retain the compact disc container. A compact disc retention device on the member has at least one first retaining tab and at least one second retaining tab on the frame to retain and guide the container. At least one locking key is on the frame to retain the guide and retention frame in the guide rails. At least one retrieving tab is attached to the compact disc container. A handle is provided on the housing. A carrying case to protect the unit and its contents is included.

5 Claims, 11 Drawing Sheets

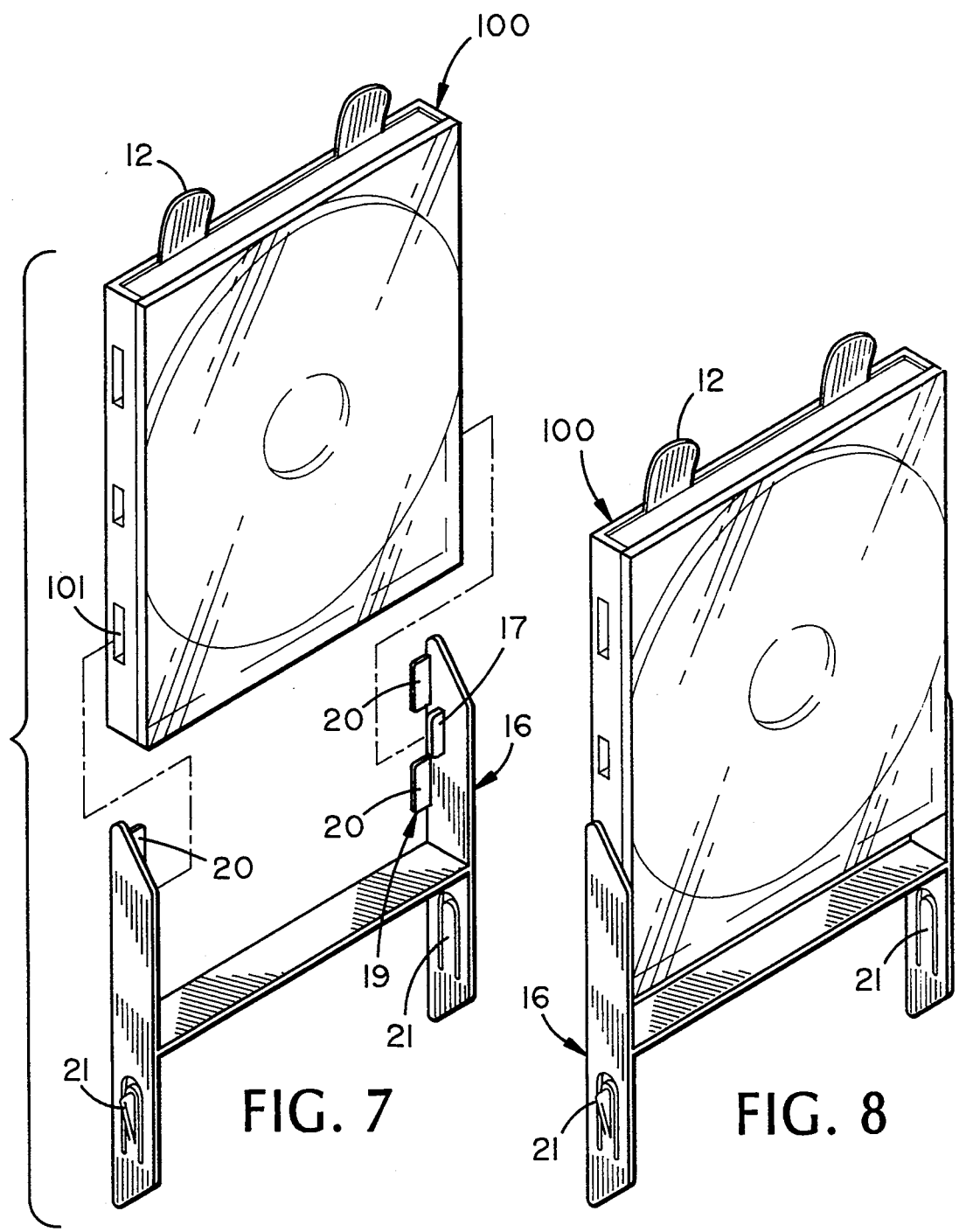

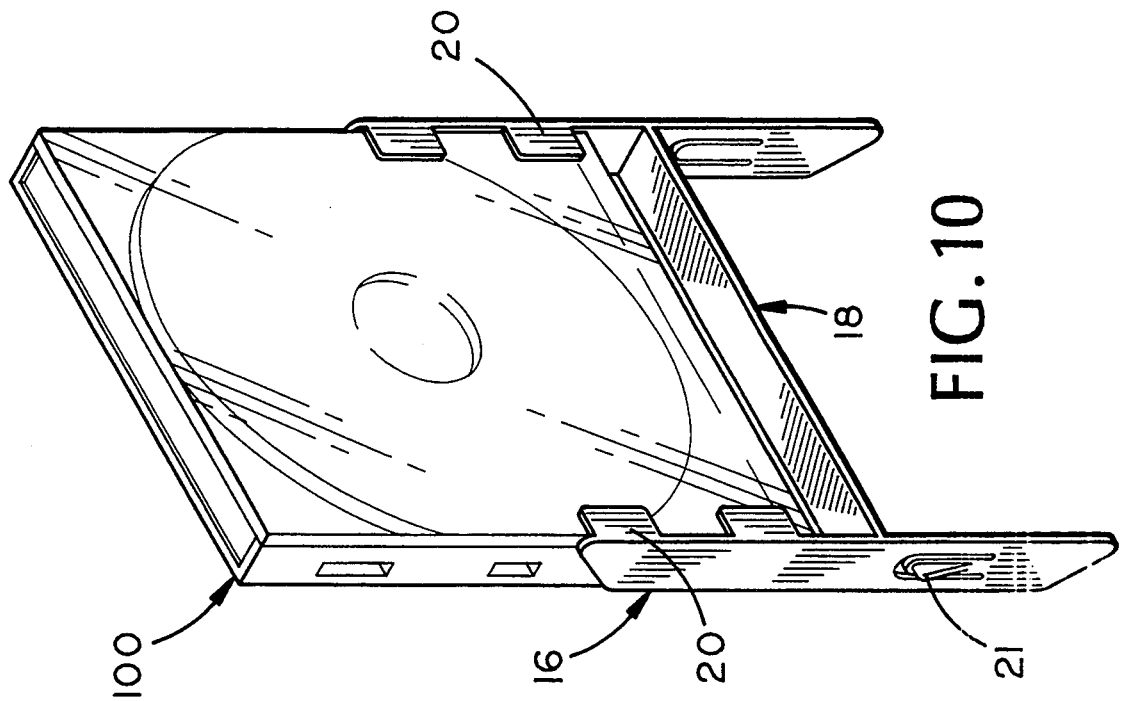
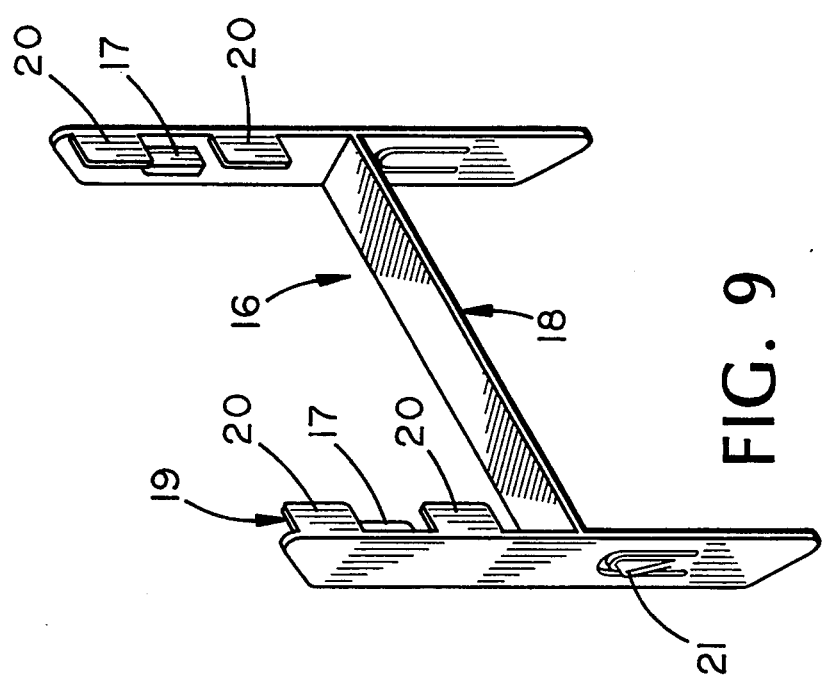
FIG. 10
FIG. 9

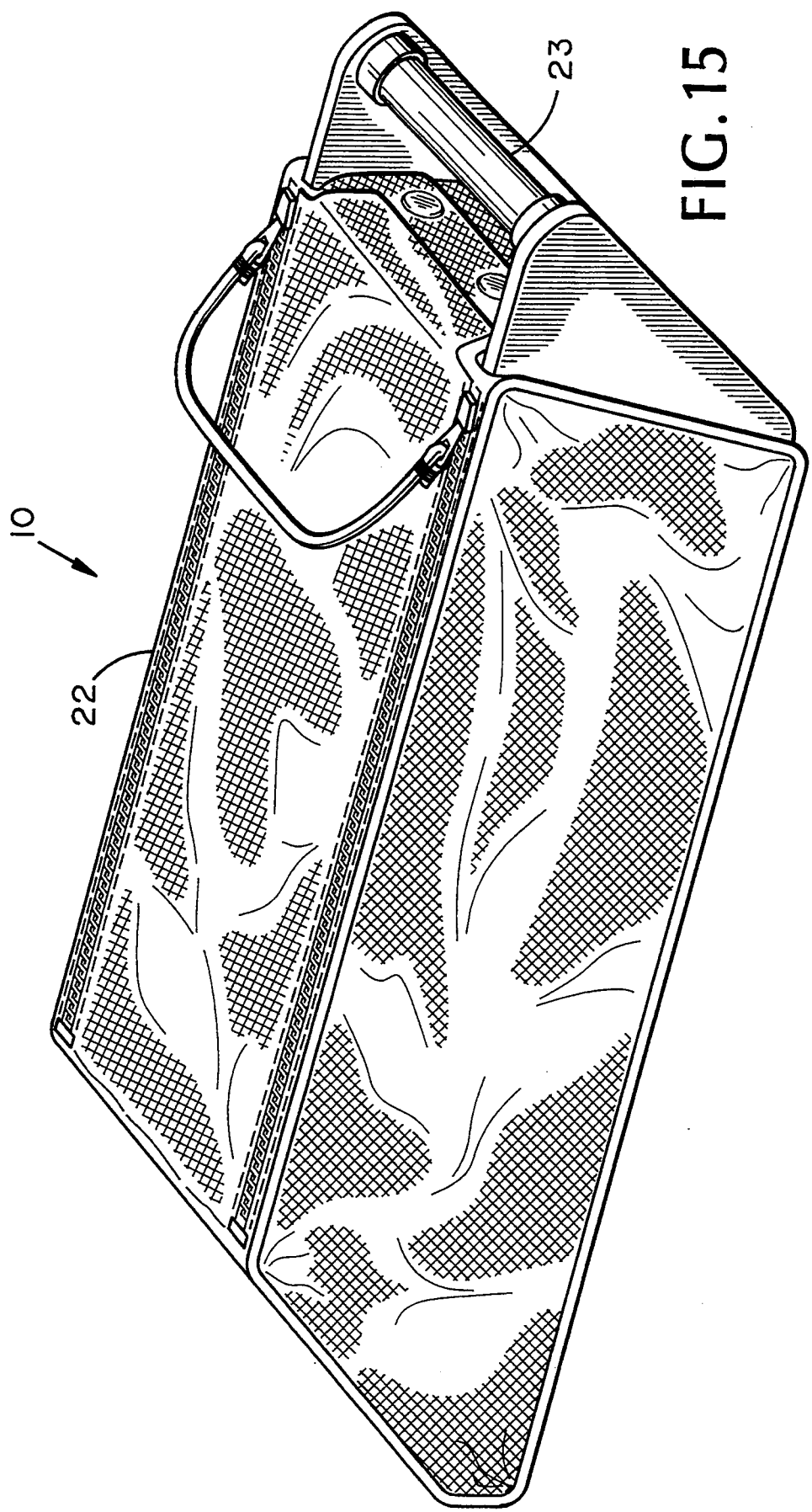

PORTABLE DISPENSING UNIT FOR COMPACT DISKS

BACKGROUND OF THE INVENTION

1. Field of the Invention

This invention relates to a carrying case for transporting compact discs. The case is designed to provide easy access to the compact discs within their containers.

2. Description of the Related Art

More and more music lovers are switching from audio tape cassettes to compact discs because of the enhanced sound quality of the discs. As a compact disc enthusiast accumulates several discs, it becomes increasingly difficult to keep them in an orderly manner and gain access to the discs stored within their individual containers. It is especially difficult to select and gain access to a compact disc while driving.

U.S. Pat. No. 4,842,032 to P. Mastronardo on Jun. 27, 1989 for a Compact Disc Carrying Case shows a bag with partitions to transport and store compact discs.

U.S. Pat. No. 4,892,189 to N. Kunimune, et al., on Jan. 9, 1990 for a Case for Multiple Compact Discs describes a hinged, two-piece case having multiple formed compartments for storing compact discs.

U.S. Pat. No. 5,031,779 to J.A. Szenay, et al., on Jul. 16, 1991 for a Compact Disc Storage Carousel shows a carousel for storing compacts in a rotatable manner.

SUMMARY OF THE INVENTION

The apparatus described herein is designed to provide ease of access to compact discs stored within their individual containers. It is often very difficult to open a compact disc container to gain access to a compact disc while a person is engaged in driving a vehicle. Using the apparatus described herein, the user locates the disc container desired and pulls the container up and out by grasping the attached retrieving tab. The container, secured to a retention frame locked in a set of guide rails, rides up out of the housing. The top half of the container remains in an upward position and the bottom half of the container drops to rest on the top of the other containers in the apparatus providing an open container which allows the user easy access to the compact disc.

One embodiment described herein is an apparatus for dispensing and transporting one or more compact discs within their individual compact disc container. The apparatus has a housing having at least one pair of opposing guide rails in the housing and at least one guide and retention member within the pair of opposing guide rails to guide and retain the compact disc container. The apparatus may have a guide and retention frame. There is at least one compact disc container retention tab on the frame and at least one locking key on the frame to retain the guide and retention frame in the guide rails. The apparatus may have at least one retrieving tab attached to the compact disc container.

Another embodiment of the apparatus for dispensing and transporting compact discs within a compact disc container has a housing and at least one pair of opposing guide rails in the housing. There may be at least one guide and retention member within the pair of opposing guide rails to guide and retain the compact disc container. The guide and retention member has a guide and retention frame and at least one compact disc container retention means on the frame. The compact disc retention means has at least one first retaining tab and at least one second retaining tab on the guide and retention frame. There is also at least one locking key on the frame to retain the guide and retention frame in the guide rails. At least one retrieving tab is attached to the compact disc container. A handle is provided on the housing. The apparatus may include a carrying case to protect the unit and its contents.

It is an object of this invention to provide a portable apparatus to transport and provide easy access to compact discs stored within their individual protective containers.

BRIEF DESCRIPTION OF THE DRAWINGS

FIG. 7 is an exploded perspective front view showing the compact disc container guide and retention member to illustrate assembly.

FIG. 8 is perspective front view showing the compact disc container assembled to the compact disc guide and retention member.

FIG. 9 is perspective rear view of the compact disc container guide and retention member.

FIG. 10 is a perspective rear view showing the compact disc container assembled to the compact disc guide and retention member.

FIG. 11 shows a resilient locking key, on the frame of the guide and retention member prior to contact with a surface on the rail.

FIG. 12 shows the surface of the rail contacting the key and pressing it away from a guide rail surface as the locking key approaches a guide rail channel.

FIG. 13 shows the locking key within the guide rail channel locking the guide and retention member into the guide rail channel.

FIG. 15 is a perspective view of a carrying bag for transportation of the portable dispensing unit for compact discs.

DESCRIPTION OF THE PREFERRED EMBODIMENTS

Referring to FIGS. 1 through 15, an apparatus 10 for dispensing and transporting compact discs (not shown) within a compact disc container 100 is described.

Figure 1:
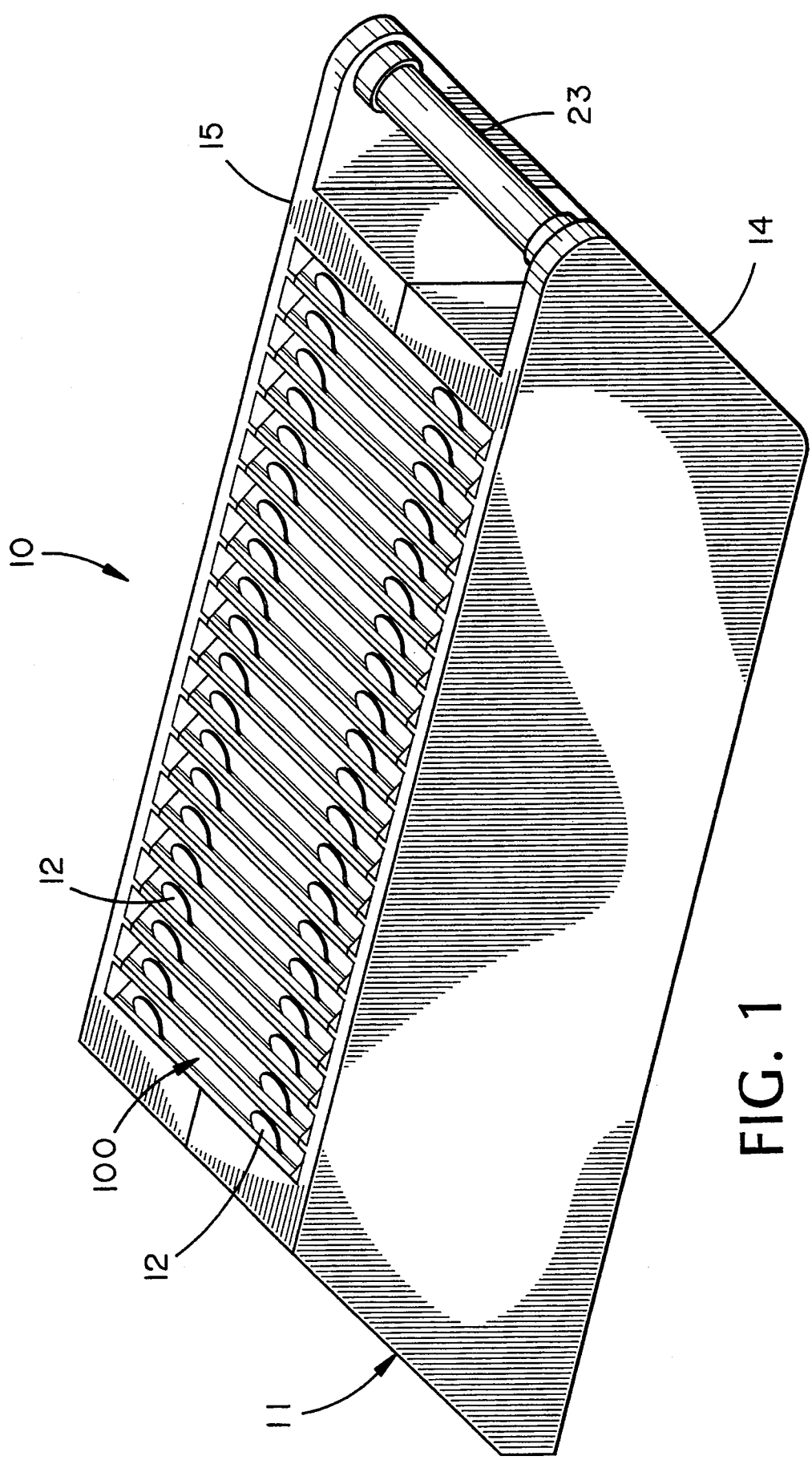
FIG. 1 is a perspective view of a Portable Dispensing Unit for Compact Discs showing compact disc containers in a container storage position, with tabs attached, within the Unit.
Figure 2:
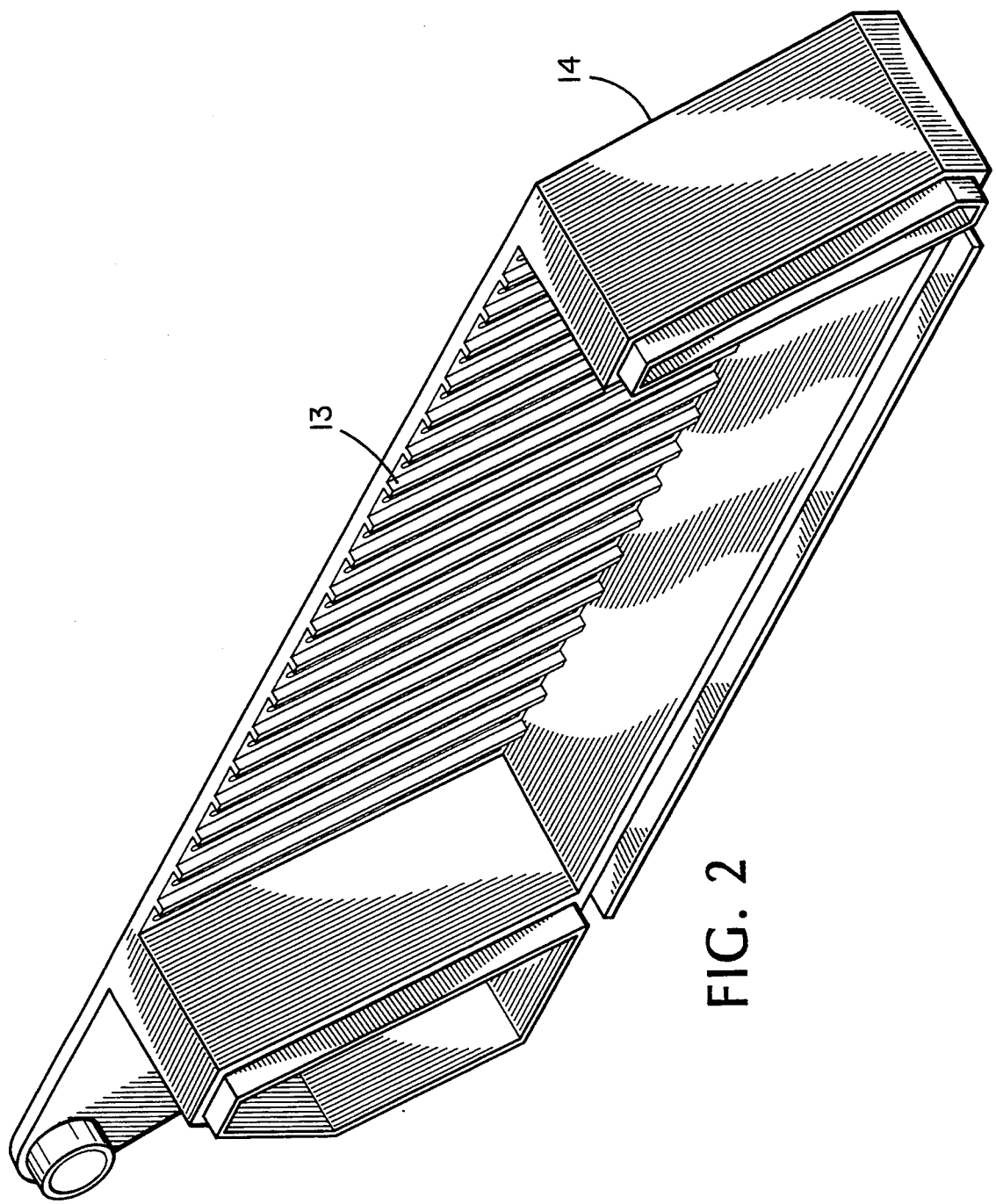
FIG. 2 is a perspective view of left half of the dispensing unit without a carrying handle.
Figure 3:
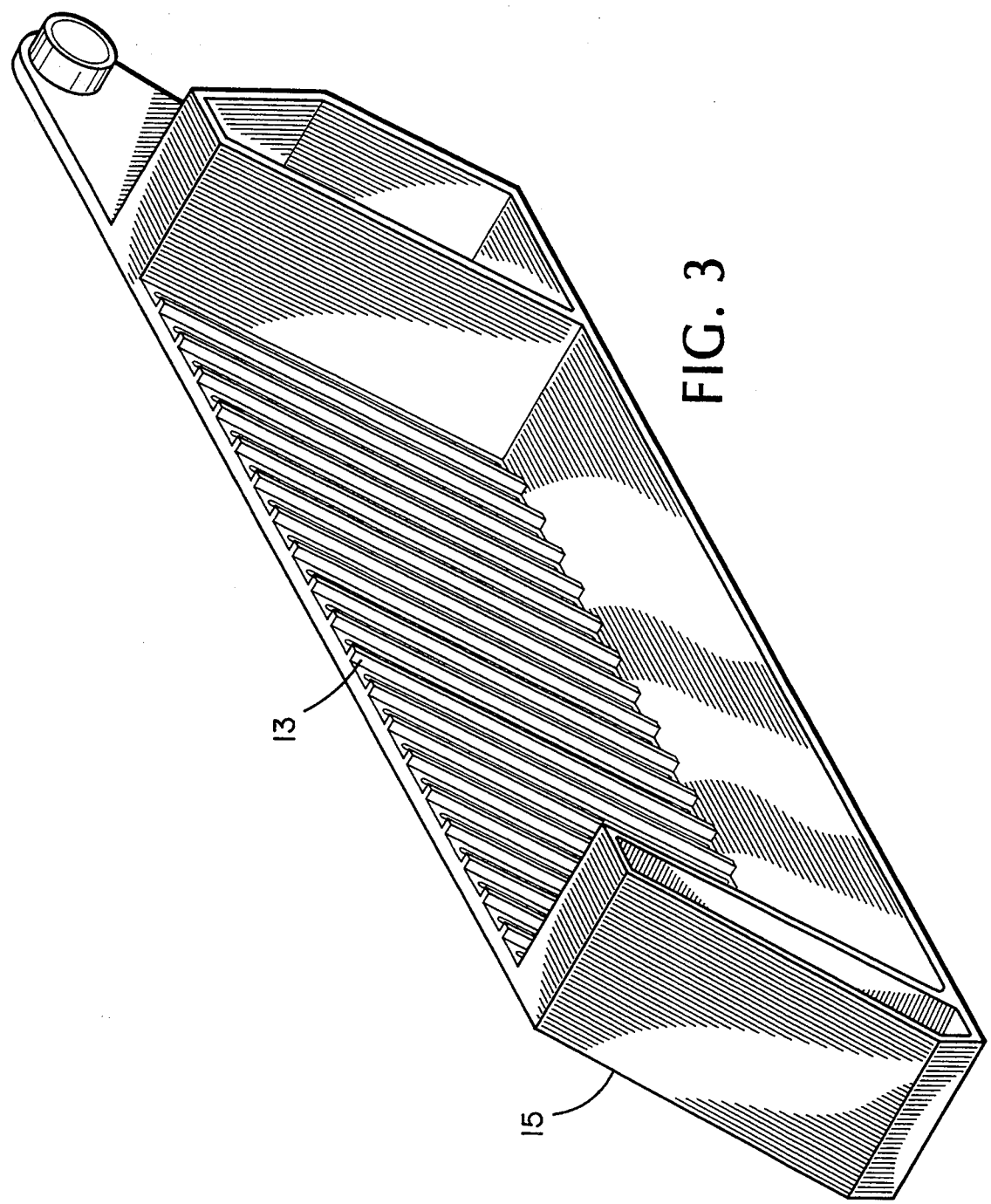
FIG. 3 is a perspective view of the right half of the dispensing unit without the handle.
Figure 4:
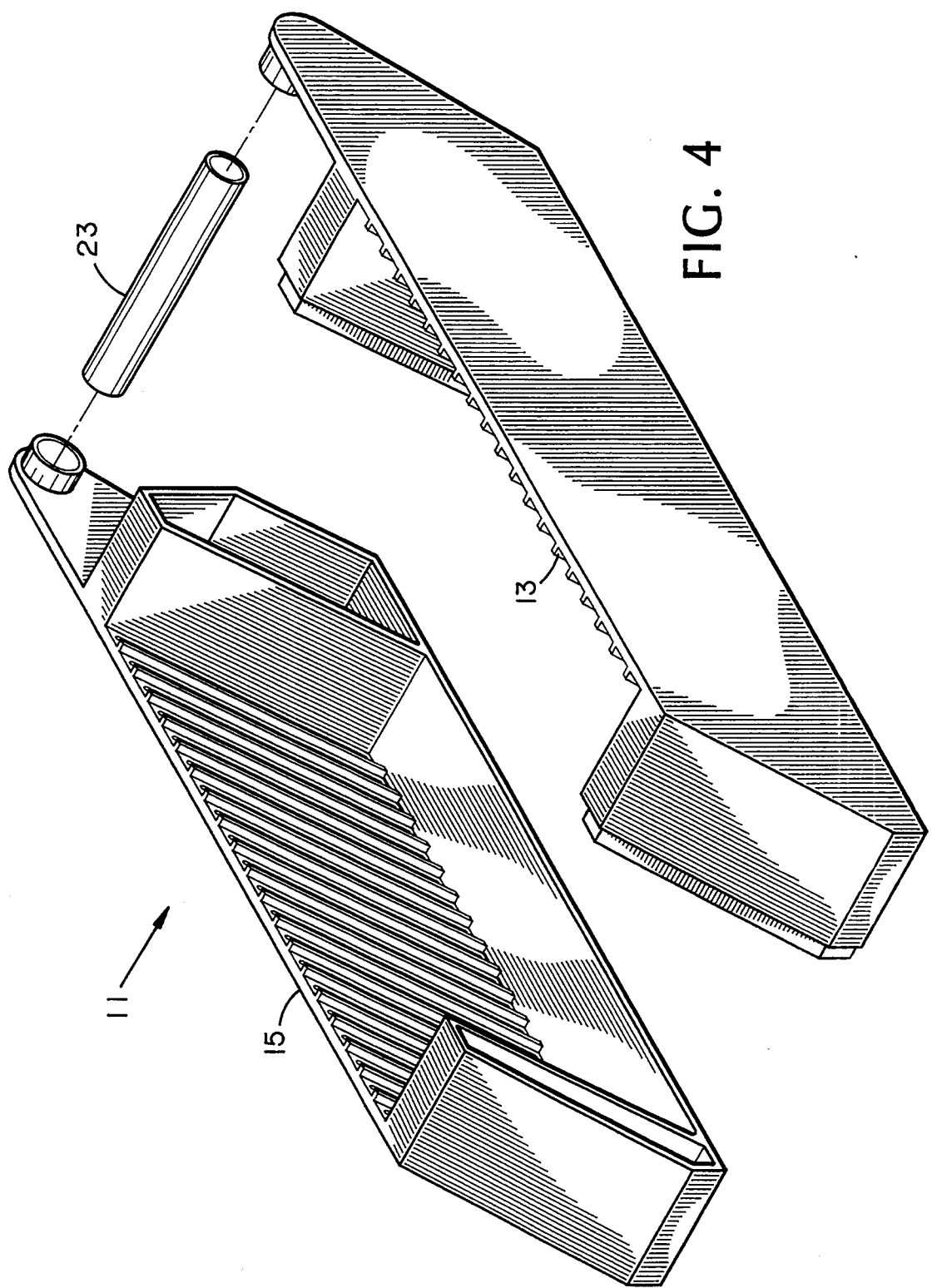
FIG. 4 is an exploded view of the dispensing unit.
Figure 5:
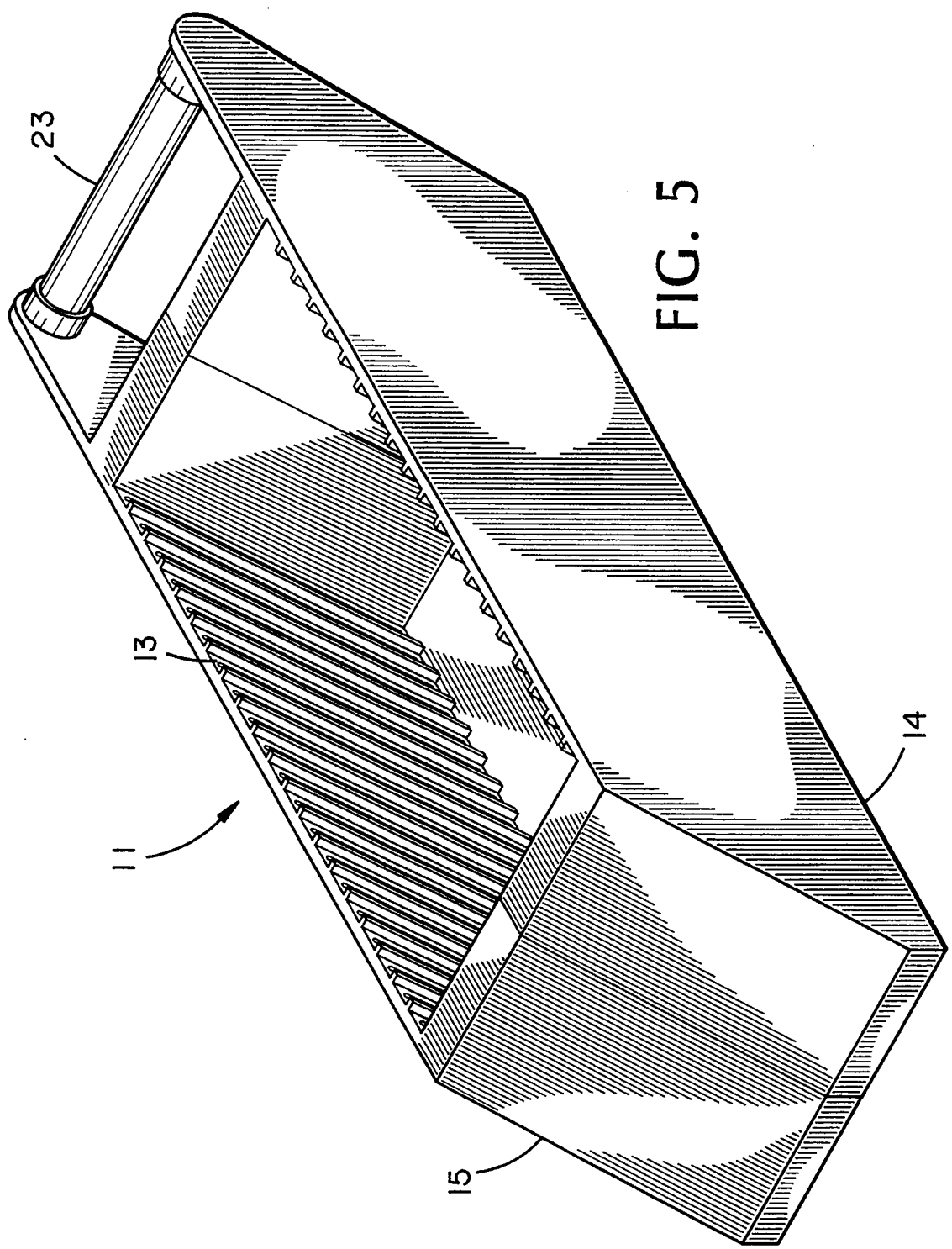
FIG. 5 is a perspective view similar to FIG. 1 but without the compact disc containers therein.

In FIG. 1, the housing 11 with a handle 23 is shown filled with compact disc containers 100. The containers are shown with two retrieving tabs 12 attached. The tabs 12 may be attached by adhesive or equivalent means to the container 100. In FIGS. 2 through 5, the guide rails 13 are shown. FIG. 5 shows the apparatus 10 without the containers 100. FIG. 2 shows the right half 14 of the housing 11 and FIG. 3 shows the left half 15 of the housing 11.

One guide and retention member 16 is inserted within a pair of opposing guide rails 13 to guide and retain the compact disc container 100 (See FIGS. 6 through 10.). See FIGS. 6 through 8 to see how to assemble the container 100 to the guide and retention member 16. The container 100 has a slot 101 into which the first retaining tab 17 is inserted.

The guide and retention member 16 has a flexible guide and retention frame 18. There is at least one compact disc container retention means 19 on the frame. The container retention means 19 comprises at least one first retaining tab 17 and at least one second retaining tab 20. On the guide and retention frame is, also, at least one flexible locking key 21 to retain the guide and retention frame in the guide rails 13.

Figure 14:
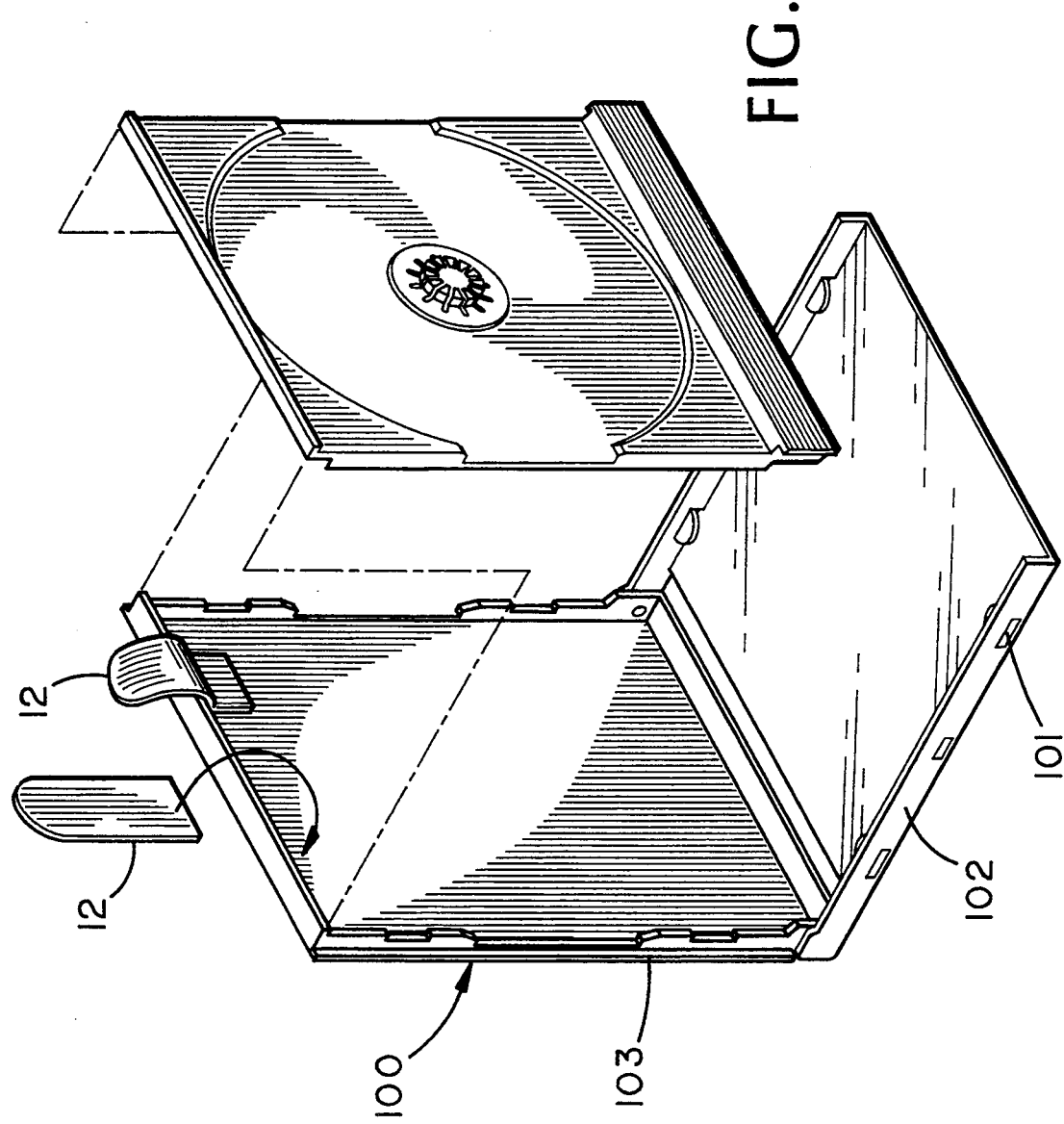
FIG. 14 is an exploded perspective view of the compact disc container showing the placement of a container retrieving tab.

In order to pull the container 100 up and out of the housing 11 along the guide rails 13, at least one retrieving tab 12 is attached to the compact disc container 100 (See FIG. 14.). A protective carrying bag 22 is provide and may be secured over housing 11.

In operation, the compact disc container 100 that a compact disc is contained in when the disc is purchased is inserted into the compact disc guide and retention member 16. The container 100 has a slot 101 already molded into its upper half 102. First retaining tabs 17 are snapped into slots 101 as shown in FIG. 7. Retaining tabs 20 snap around upper half 102 as shown in FIG. 10. The container 100 is thereby removably secured to the frame 18. Reversal of this procedure will allow the user to remove the container 100 from the frame 18.

Figure 11:
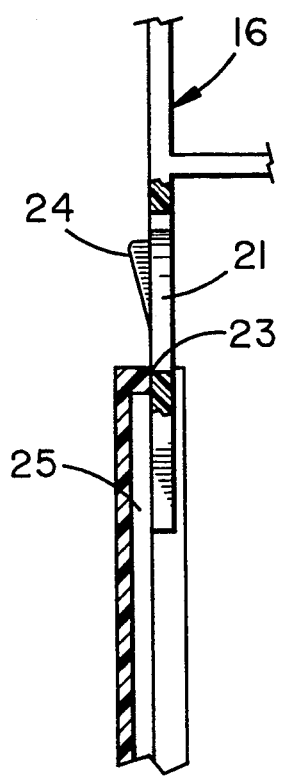
FIGS. 11, 12 and 13 are partial cross-sectional views, along line 13—13 in FIG. 8, showing the assembly of the compact disc container guide and retainer member into a guide rail in a housing of the dispensing unit.
Figure 12:
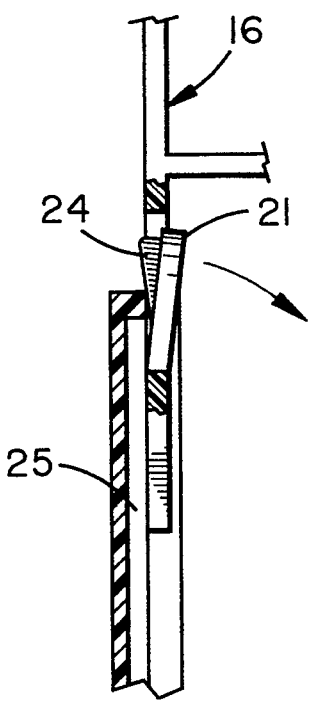
Figure 13:
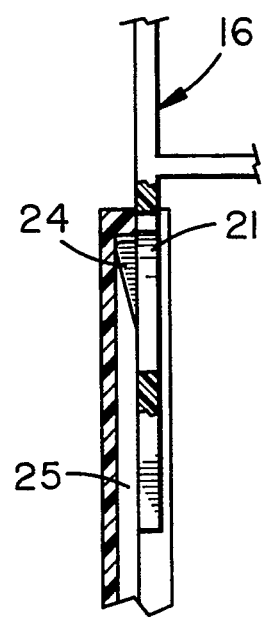

Guide and retention frame 18, with the container 100 fitted therein, is placed in alignment with a set of opposing guide rails 13 as shown in FIGS. 11 through 13. Downward pressure is applied to the frame 18 until surface 23 of the housing 11 contacts surface 24 of flexible locking key 21. Further downward movement causes locking key 21 to move from a locked position shown in FIGS. 11 and 13 to an unlocked position shown in FIG. 12. When the locking key 21 enters the channel 25 of the guide and retention rail 13, as shown in FIG. 13, the frame 18 is restricted in its movement to the travel allowed in channel 25. Container 100 is thereby removably secured into the housing. Reversal of this procedure will allow removal of the frame 18 and the container 100 from the housing 11.

Figure 6:
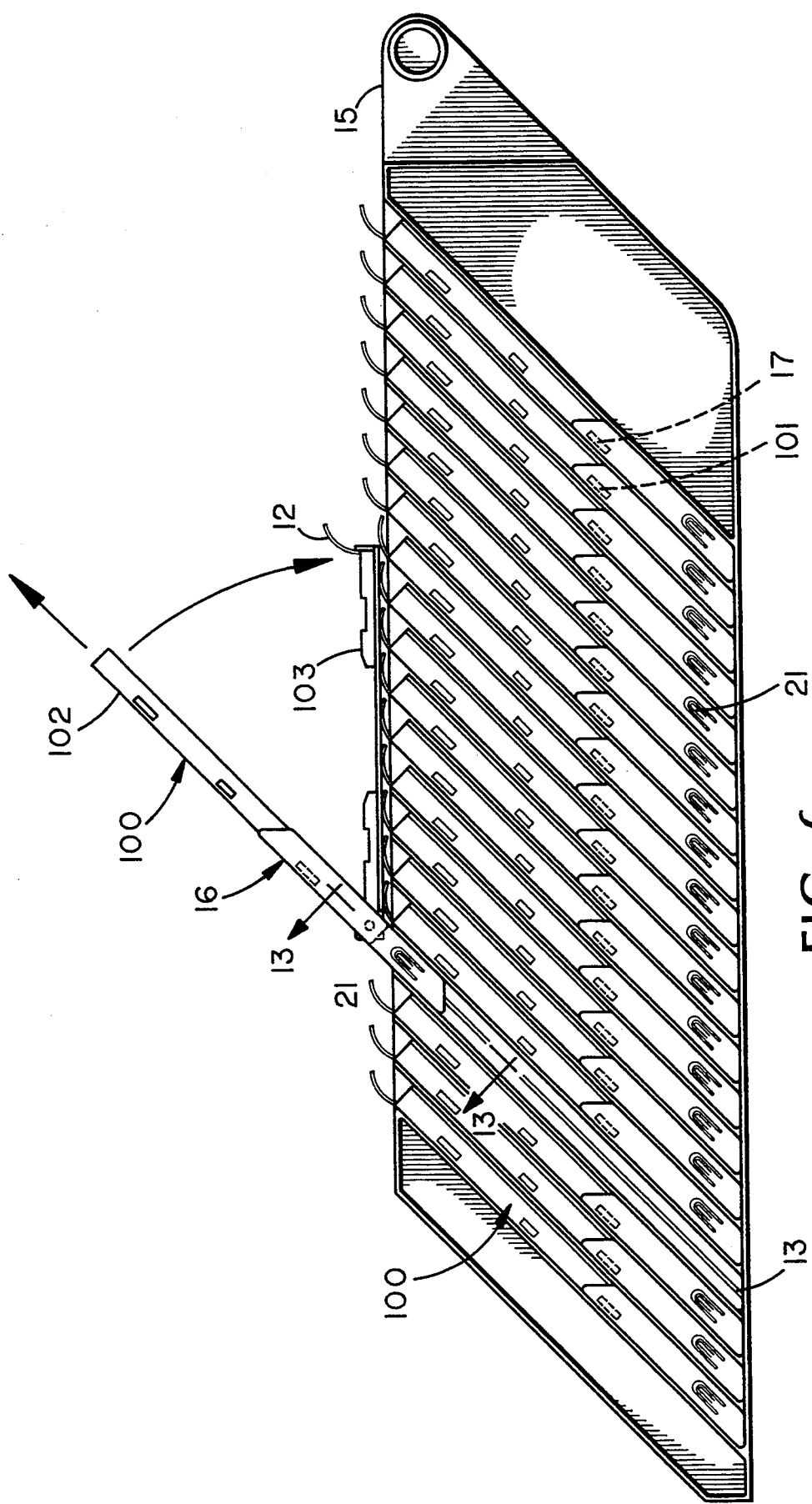
FIG. 6 is a right side view of the left half of the dispensing unit showing the compact disc containers in place with one of the containers pulled up into a container access position.

As container 100 is pulled out of housing 11, the top half 102 of the container 100 remains secured within frame 18. However, the bottom half 103 of container 100 pivots on its hinged attachment to upper half 102 and comes to rest on top of the other containers 100 within housing 11 as shown in FIG. 6. Since the container is now in the open position, access to the compact disc is provided. When the user is finished with the compact disc, the disc is placed back in its place within the container 100 and the process is reversed.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. An apparatus for dispensing and transporting compact discs within compact disc container comprising:
   (a) a housing;
   (b) at least one pair of opposing guide rails in the housing; and
   (c) at least one guide and retention member, within the pair of opposing guide rails to guide and retain the compact disc container, comprising:
   a guide and retention frame;
   at least one compact disc container retention tab on the frame;
   at least one retrieving tab attached to the compact disc container; and
   at least one locking key on the frame to retain the guide and retention frame in the guide rails.

2. An apparatus for dispensing and transporting compact discs within a compact disc container comprising:
   (a) a housing;
   (b) at least one pair of opposing guide rails in the housing;
   (c) at least one guide and retention member within the pair of opposing guide rails to guide and retain the compact disc container comprising:
   a guide and retention frame;
   at least one compact disc container retention tab on the frame; and
   at least one locking key on the frame to retain the guide and retention frame in the guide rails;
   (d) at least one retrieving tab attached to the compact disc container; and
   (e) a carrying case.

3. An apparatus for dispensing and transporting compact discs within a compact disc container comprising:
   (a) a housing;
   (b) at least one pair of opposing guide rails in the housing;
   (c) at least one guide and retention member within the pair of opposing guide rails to guide and retain the compact disc container comprising:
   a flexible guide and retention frame;
   at least one compact disc container retention means on the frame; and
   at least one flexible locking key on the frame to retain the guide and retention frame in the guide rails;
   (d) at least one retrieving tab attached to the compact disc container; and
   (e) a carrying case.

4. An apparatus as described in claim 3 wherein the compact disc retention means further comprises:
   (a) at least one first retaining tab on the guide and retention frame; and
   (b) at least one second retaining tab on the guide and retention frame.

5. An apparatus as described in claim 3 further comprising a handle on the housing.

* * * * *